June 10, 1941.　　　H. A. GUILL　　　2,245,271

SAFETY CUTOFF VALVE

Filed July 1, 1938

Inventor
Howard A. Guill,
By Smith, Michael and Gardiner
Attorney

Patented June 10, 1941

2,245,271

UNITED STATES PATENT OFFICE 2,245,271

SAFETY CUTOFF VALVE

Howard A. Guill, Augusta, Ga.

Application July 1, 1938, Serial No. 217,039

1 Claim. (Cl. 251—144)

This invention is a safety cut-off valve designed to be inserted in a fluid pressure conduit between the source of supply and the source of consumption, and operates to automatically cut off the flow of fluid through the conduit upon loss of pressure in the conduit between the safety cut-off valve and the point of consumption.

The invention is capable of general application to automatically control the flow of fluids, either gases or liquids, but is designed particularly for high pressure equipment such as oxygen-acetylene gas welding equipment. In this type of welding equipment the gases under high pressure are supplied from tanks to the welding torch through flexible conduits under the control of pressure regulators. In practice, one or both of the flexible conduits may become broken or burned while the torch is in operation, with the result that fire ensues, which is quite hazardous to the operator. Also, the occurrence of such a break in the conduit results in the total loss of gas in the supply tank. Furthermore, it is the practice in operating gas welding equipment of the character referred to, to gradually screw in on the diaphragm regulator as the supply of gas in the tank nears exhaustion, in order to completely exhaust the supply of gas. Often, a regulator that has been adjusted to utilize all of the gas in a tank is subsequently attached to a new tank without readjusting the regulator, in which event the high pressure under which gas from a new tank is released seriously damages the regulator.

With these facts in mind the present invention seeks to provide a safety cut-off valve, automatic in its operation, and interposed between the supply tank and the welding torch, preferably immediately adjacent the discharge nipple of the gas tank, which valve is normally open but which operates to automatically close and stop the flow of gas from the tank in the event of loss of pressure in the conduit beyond said valve, such as might occur from the breaking of one of the conduits or the release of gas from a fresh tank into a regulator improperly adjusted.

More particularly, the invention comprehends a valve biased to open position against the flow of gas through the valve, and which is designed to close upon loss of pressure in the conduit at the discharge side of the valve.

Another object of the invention is to provide in a valve of the character described auxiliary means for cutting off the flow of gas through the valve upon the occurrence of predetermined conditions even though the valve is unable to completely seat due to accumulation of dirt on the valve seat.

Another object of the invention is to provide means for regulating the normal rate of flow of fluid through the valve.

Another object of the invention is to provide in a valve of the character described means whereby the threads employed for interconnecting parts of the valve casing are protected from the high pressure of the fluid in the line.

Another object of the invention is to provide in a valve of the character described effective gas bypass ducts around the valve through which the gas normally flows to the point of consumption, and which ducts may be closed at a plurality of points upon the occurrence of predetermined conditions.

Another object of the invention is to provide a valve unit of the character described having means for readily connecting the same to conventional welding equipment between the discharge nipple of the gas supply tank and the inlet fitting of the conventional pressure gauge and regulating unit.

These and other objects of the invention will become apparent from a reading of the following specification, wherein I have described a preferred form of the invention which is illustrated in the accompanying drawing, wherein.

Figure 1:
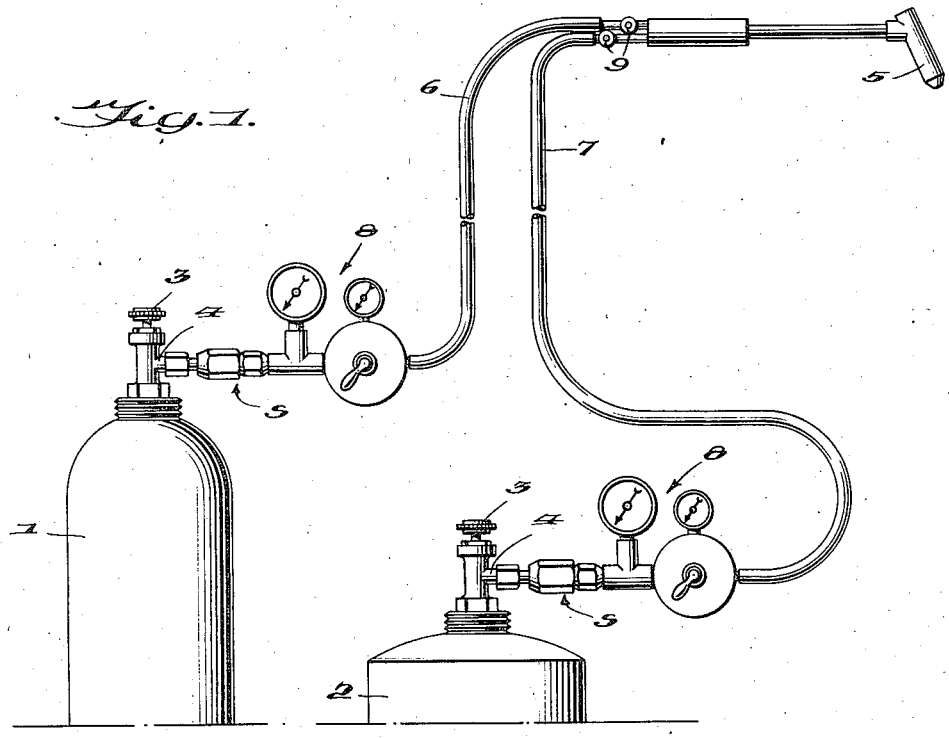
Figure 1 is a diagrammatic view of a conventional gas welding equipment showing my invention included therein.

Referring more particularly to the accompanying drawing, I have shown in Fig. 1 a more or less diagrammatic arrangement of conventional oxygen-acetylene gas welding equipment, including a supply tank I containing oxygen and a supply tank 2 containing acetylene. The tanks are each provided with conventional discharge cocks 3 having discharge nipples 4. The welding torch 5 is connected, respectively, to the tanks I and 2 by flexible conduits or hose lines 6 and 7, each of said lines being connected to the respective tanks through a conventional pressure gauge and regulating unit 8. In practice, the gases of the tanks I and 2 are released by opening the discharge cocks 3 and properly adjusting the regulators 8 to any proper gas pressure at the torch 5. Each of the lines 6 and 7 is provided with a supplemental control valve 9 adjacent the torch 5 for proportioning the flow of gas to said torch. The equipment as thus far described is conventional and forms no part of the present invention.

The safety cut-off valve forming the subject-matter of my invention is shown incorporated in the welding equipment of Fig. 1 and indicated by the reference character S. The safety cut-off valve comprises a sectional valve casing comprising casing members 10 and 11. Casing member 10 is provided with a bore extending therethrough from end to end, one end of said bore being enlarged and internally screw-threaded as shown at 12. Said interiorly threaded section 12 terminates at its inner end at a cylindrical section 13 of slightly lesser diameter than the screw-threaded portion 12, said cylindrical portion 13 in turn terminating in an annular shoulder 14. The bore or passage through the casing member 10 is further reduced at the opposite end 15, said reduced section being interiorly screw-threaded as at 16 to take a connecting nipple 17, said nipple being provided with the usual flange 18 and screw-threaded coupling member 19 designed for attachment to the discharge nipple of a conventional gas supply tank, such as shown in Fig. 1.

Figure 2:
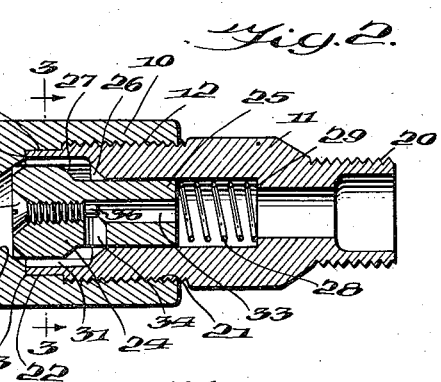
Fig. 2 is a sectional view of my automatic safety cut-off valve.
Figure 3:
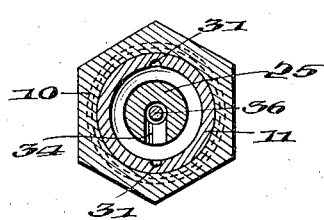
Fig. 3 is a sectional view taken on the line 3—3 of Fig. 2.
Figure 4:
Fig. 4 is a top plan view of the valve element of my safety cut-off valve.

The casing member 11 is likewise provided with a bore extending therethrough from end to end and said member is provided as indicated at 20 with an externally screw-threaded portion adapted to be connected to the pressure gauge and regulating unit of conventional welding apparatus. The opposite end of the casing member 11 is externally screw-threaded at 21 to cooperate with the screw-threaded portion 12 of the casing member 10, said threaded portion 21 terminating in a cylindrical portion 22 of a diameter substantially equal to that of the cylindrical portion 13 of the casing member 10. The cylindrical portion 22 of the casing member 11 is proportioned so that the extreme end 23 of the casing member 11 abuts the annular shoulder 14 of the casing member 10 when said casing members 10 and 11 are operatively engaged, as shown in Fig. 2. The engagement between the end 23 of the casing member 11 and the annular shoulder or seat 14 of the casing member 10 is substantially gas-tight and is designed to relieve the screw-threads 12 and 21 from the extremely high pressures encountered in the use of gas-welding equipment.

The casing members 10 and 11, as shown in Fig. 2, are cooperatively formed interiorly to provide a valve chamber intermediate the ends of the joined casing members. Within the valve chamber is positioned a valve member 24, said valve being provided with a stem portion 25 engaging the wall of the passage through the casing member 11 at the discharge side of the valve. The valve chamber is provided with a valve seat 26 and the valve is provided with a cooperating face 27 designed to seat upon the inclined valve seat 26 when the valve is closed. The valve 24 is normally maintained in a fully open position by biasing spring 28 interposed between the free end of the valve stem 25 and a shoulder 29 formed within the passage through the casing member 11. In order to define the position of the valve under the influence of the biasing spring 28, the valve chamber is provided at its opposite end with an inclined abutment wall 30 against which the valve 24 is urged by the biasing spring 28.

The valve 24 is designed to permit the passage of gas around the valve and between it and the wall of the valve chamber in the open position of the valve, and to this end the wall of the valve chamber is provided with one or more longitudinally disposed ducts or grooves 31 extending from the abutment wall 30 to the valve seat 26. As shown in Fig. 2, the valve chamber and the valve are dimensioned so that there is provided at the inlet end of the grooves 31 an annular space between the valve and the abutment wall 30. The gas flows into this space through a plurality of grooves or notches 32 formed at the abutment engaging edge of the valve 24. The grooves 31 and 32 thus provide means for leading the gas around the head of the valve and into the space between the valve seat 26 and the valve face 27 in the open position of the valve, as shown in Fig. 2. In order to provide means for the gas to flow from this space into the bore of casing member 11 and to the torch 5, the valve stem 25 is provided with a duct 33 opening on opposite sides of the valve seat 26. The inlet opening 34 of said duct 33 opens laterally of the stem 25 at a point spaced from the valve face 27 and, in the normal position of the valve as shown in Fig. 2, lies adjacent the valve face 26. This disposition of the inlet opening to the duct 33 insures said duct being closed even though the valve face 27 cannot engage its seat 26 due to the dirt or debric lodging on said valve seat.

I also provide means for varying or metering the rate of flow of gas through the duct 33 in order to adjust the valve to different rates of gas consumption depending upon the type of welding being performed. To this end I provide the valve 24 with a metering pin 36, said pin being screwed into the head of the valve and having a metering portion 36 lying against the inlet 34 of the duct 33. By employing metering pins of different sizes the normal rate of flow of gas through the valve may be regulated.

Having thus described the invention, it will be understood that for normal flow of gas through the valve the position of the parts shown in Fig. 2 is maintained. If, however, the conduit by which gas flowing through the valve is delivered to the torch 5 breaks, with the resulting loss of pressure in the conduit between the safety cut-off valve and the torch, the sudden rush of gas through the valve is effective to overcome the force of the biasing spring 28 and the valve immediately closes and is maintained closed by the pressure of the gas at the supply tank 1 or 2. Immediately upon repair of the hose line and upon the reestablishment of proper pressures on opposite sides of the valve, the spring 28 is effective to open the valve to permit normal flow of gas therethrough.

Proper pressure conditions may be quickly reestablished by cutting off the gas at the tank valve 3 and then "cracking" the coupling member 19 on the tank side of the valve, to release the high pressure between the tank valve 3 and the automatic valve 24. The spring 28 quickly opens the valve and the coupling is then tightened again and the apparatus in condition for use.

Similarly, in instances where a pressure regulator unit having been adjusted to abnormal flow for the purpose of completely evacuating a previous cylinder is connected to a new cylinder through my safety cut-off valve, the valve is immediately effective to cut off the flow of gas to the regulator until it has been properly adjusted for the high pressure in the new container of gas. This feature of my invention is of considerable importance as it prevents damage to the regulator resulting from subjecting it to abnormal pressure.

From the foregoing it will be understood that I have provided a safety cut-off valve designed for high pressure gas equipment, particularly welding equipment, which valve is biased to a normally open position to permit normal flow of gas through the device, but which operates automatically to close the valve upon drop in pressure in the conduit to which the device is connected. This operation is effective to safeguard the welding equipment from fire hazard and loss of gas due to rupture of the flexible conduits by which gas is supplied to the welding torch, as well as protecting an improperly adjusted regulator from damage due to high pressure of gas in the new container.

In conclusion, it is to be understood that while I have herein illustrated and described a preferred embodiment of my invention, I reserve the right to make such changes in the form, size and proportion of parts as fairly fall within the scope of the appended claim, without departing from the spirit of the present invention.

Having thus described my invention, what I claim as new and desire to secure by Letters Patent is:

A safety cut-off valve comprising a casing having a passage extending therethrough from end to end, said passage being enlarged intermediate its ends to provide a valve chamber, an annular valve seat at one end of the chamber, a valve abutment at the opposite end of the chamber, a valve positioned in the valve chamber having a face cooperating with the valve seat to close the passage, means for biasing the valve against said abutment in open position against the flow of fluid through the passage, said chamber wall being provided with longitudinal grooves extending between said abutment and said valve seat, the abutment engaging portion of the valve being provided with substantially radial grooves communicating with the inlet ends of the grooves in the chamber wall to bypass fluid around the valve when in open position, and a stem on the valve engaging the wall of the passage at the discharge side of the valve seat, said stem being provided with a duct having its inlet end lying within the valve chamber when the valve is open and in communication with the discharge ends of the grooves in the chamber wall, said valve, in moving to closed position, closing the grooves in the chamber wall at the valve seat, and closing the inlet end of the duct in the valve stem by moving it beyond the discharge side of the valve seat.

HOWARD A. GUILL.